United States Patent
Pu (10) Patent No.: US 9,185,640 B2
(45) Date of Patent: Nov. 10, 2015

(54) METHOD AND RELATED MOBILE DEVICE FOR SEARCHING FOR A MOBILE NETWORK

(71) Applicant: Intel Mobile Communications GmbH, Neubiberg (DE)

(72) Inventor: Tianyan Pu, Dresden (DE)

(73) Assignee: Intel Mobile Communications GmbH, Neubiberg (DE)

( * ) Notice: Subject to any disclaimer, the term of this patent is extended or adjusted under 35 U.S.C. 154(b) by 179 days.

(21) Appl. No.: 13/937,046

(22) Filed: Jul. 8, 2013

(65) Prior Publication Data

US 2015/0011207 A1    Jan. 8, 2015

(51) Int. Cl.
*H04W 4/00* (2009.01)
*H04W 48/16* (2009.01)

(52) U.S. Cl.
CPC ..................... *H04W 48/16* (2013.01)

(58) Field of Classification Search
CPC ..... H04W 36/00; H04W 48/18; H04W 48/20; H04W 72/02
See application file for complete search history.

(56) References Cited

U.S. PATENT DOCUMENTS

| | | | |
|---|---|---|---|
| 2004/0028160 A1* | 2/2004 | Bienek et al. | 375/354 |
| 2005/0075125 A1* | 4/2005 | Bada et al. | 455/525 |
| 2010/0062764 A1* | 3/2010 | Aiouaz et al. | 455/434 |
| 2010/0197301 A1* | 8/2010 | Islam et al. | 455/434 |
| 2012/0184269 A1* | 7/2012 | Wilhelmsson et al. | 455/426.1 |
| 2012/0252446 A1* | 10/2012 | Reial et al. | 455/434 |
| 2012/0294173 A1* | 11/2012 | Su et al. | 370/252 |
| 2014/0018070 A1* | 1/2014 | Ji et al. | 455/434 |
| 2014/0153479 A1* | 6/2014 | Aiouaz et al. | 370/328 |

* cited by examiner

*Primary Examiner* — Nathan Mitchell
*Assistant Examiner* — Shantell L Heiber
(74) *Attorney, Agent, or Firm* — Schwegman Lundberg & Woessner, P.A.

(57) ABSTRACT

Instead of performing a complete frequency scan and a subsequent cell scan on detected candidate frequencies, according to the method for searching for a PLMN as disclosed herein, the frequency scan is interrupted for performing an immediate cell scan based on inspection results for a specific candidate frequency obtained during the frequency scan. During the cell scan, the bandwidth among other parameters of the cell may be detected. Based on the detected bandwidth, certain candidate frequencies falling into the detected bandwidth can be skipped when resuming the frequency scan.

26 Claims, 8 Drawing Sheets

METHOD AND RELATED MOBILE DEVICE FOR SEARCHING FOR A MOBILE NETWORK

FIELD OF THE INVENTION

The present disclosure relates a method and related mobile device for searching for a mobile network. The present disclosure specifically relates to a method and relate mobile device for searching for cellular mobile network, for example a public land mobile network (PLMN) based on orthogonal frequency division multiplexing (OFDM).

BACKGROUND OF THE INVENTION

PLMN search is an important feature for a mobile device in a mobile communication system since it directly impacts the user experience when a user powers up the mobile device to find a network or has to do a network scan. Therefore, the faster and more accurate a PLMN search can finish, the better will be the user experience.

Normal PLMN search consists of two consecutive steps, frequency scan and cell scan. Frequency scan is carried out first for all candidate frequencies, for example in an LTE system for E-UTRA Absolute Radio Frequency Channel Numbers (EARFCNs), to identify frequencies, which most likely contain a cell. After a complete frequency scan, a cell scan is carried out for each detected frequency, in an LTE system for each detected EARFCN, to check whether there are cells there or not.

There are two drawbacks with the above PLMN search method. First of all, the time spent on the frequency scan can be quite long when the number of candidate frequencies is large. For example, in an LTE system totally 692 EARFCNs are specified. Secondly, the system parameters used during frequency scan are normally biased towards a worst case scenario at sacrifice of some performance metrics. For example, with respect to a frequency offset, in the absence of any a priori knowledge of the frequency offset as is the case when the mobile device powers up, a worst case scenario would mean a large frequency offset is assumed to exist throughout the entire frequency scan stage. Therefore, the frequency scan method has to be robust against large frequency offsets, potentially at the cost of sensitivity.

BRIEF DESCRIPTION OF THE DRAWINGS

Reference will be made to the accompanying drawings, which include the following figures.

DETAILED DESCRIPTION

Figure 1:
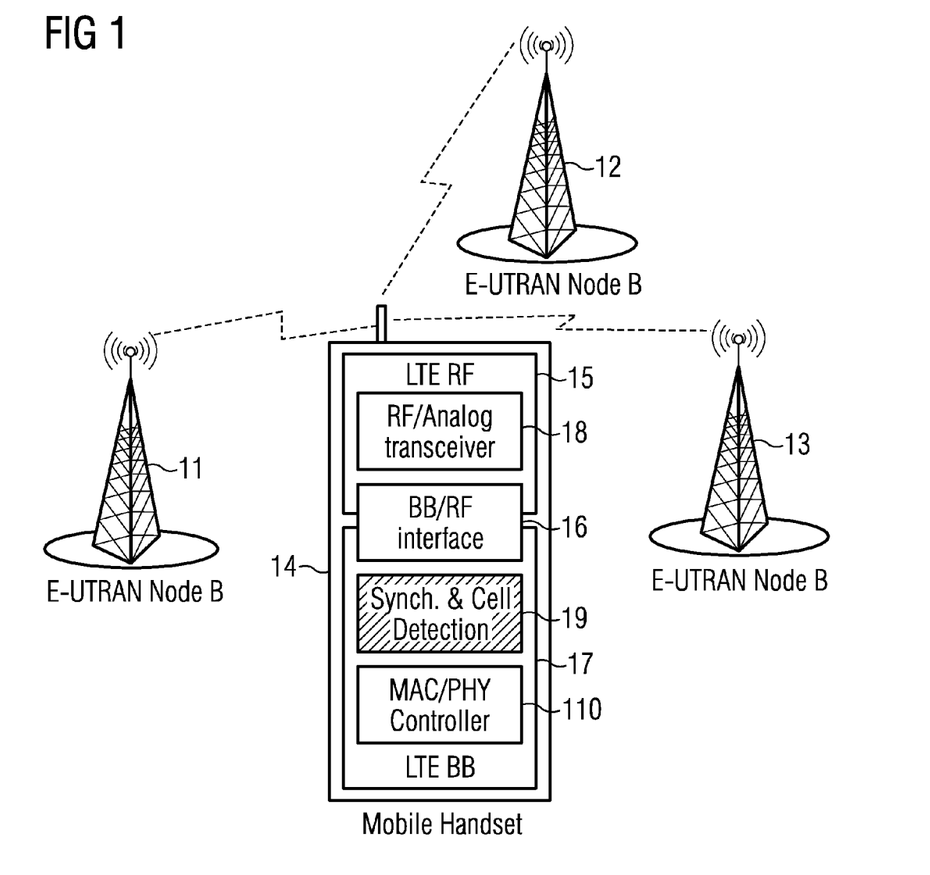
FIG. 1 shows a block diagram of a mobile communication system.

FIG. 1 shows a mobile communication system comprising three base stations 11, 12, 13 and a mobile device 14. When powering up the mobile device 14 has no knowledge about the deployment of PLMNs by the base stations 11, 12, 13. If the mobile device 14 wishes to attach to a cell of a PLMN the mobile device has to perform a PLMN search. PLMN search comprises a frequency scan and a cell scan and is part of the baseband processing performed in the baseband processing module 17, specifically in the synchronization and cell detection module 19. The mobile device further comprises a radio frequency module 15 including a radio frequency/analog transceiver 18 for acquiring radio samples. Radio samples are transferred from the radio frequency (RF) module 15 to the base band (BB) processing module 17 via BB/RF interface 16.

Instead of performing a complete frequency scan and a subsequent cell scan on detected candidate frequencies, according to the method for searching for a mobile network, specifically a PLMN, as disclosed herein, the frequency scan is interrupted for performing an immediate cell scan based on inspection results for a specific candidate frequency obtained during the frequency scan. During the cell scan, the bandwidth among other parameters of a cell may be detected. Based on the detected bandwidth, certain candidate frequencies falling into the detected bandwidth can be skipped when resuming the frequency scan.

The method will be described with reference to FIG. 1 and FIG. 2. First, in the wideband data buffering stage 21 of FIG. 2 a wideband signal is received via the BB/RF interface 16 of FIG. 1 from the RF/Analog transceiver 18 of FIG. 1. The wideband signal is then processed in the synchronization and cell detection module 19 of FIG. 1. During PLMN search, the mobile device normally does not perform other operations. Therefore, most of the on-chip memories, e.g. Hybrid Automatic Repeat reQuest (HARQ) memory, can be used for buffering the wideband signal.

Figure 2:
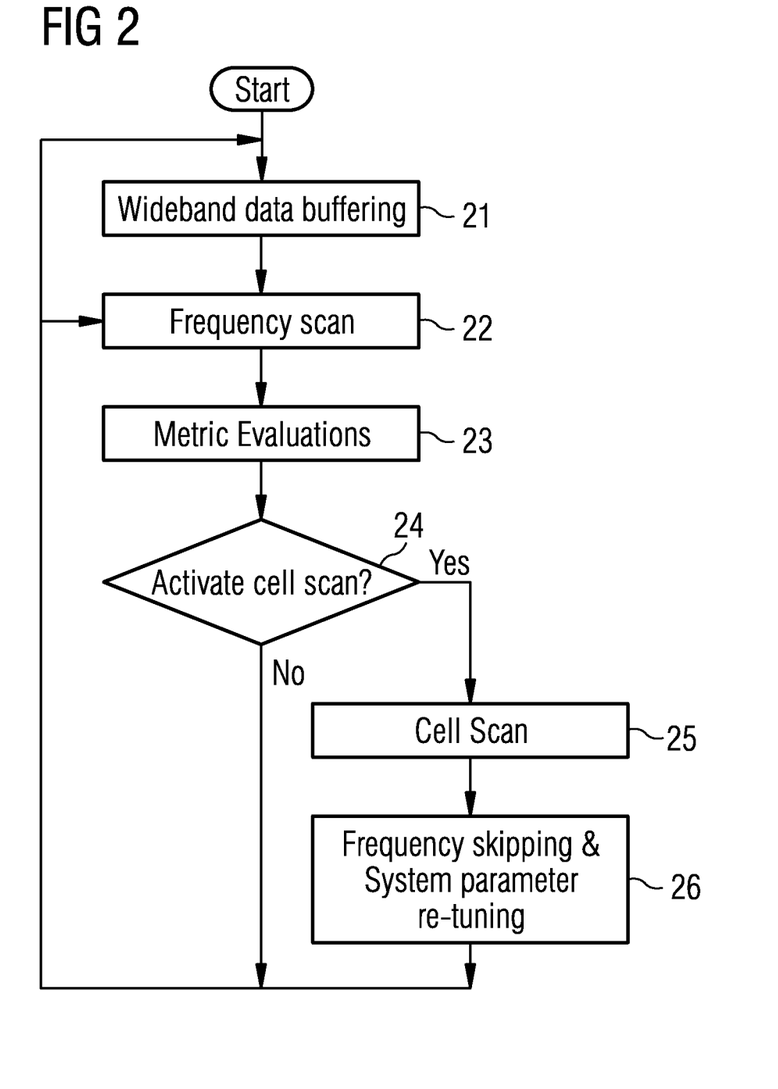
FIG. 2 shows a flow chart of a fast PLMN search method.

The method for searching for a mobile network, specifically a PLMN, comprises performing a frequency scan, see frequency scan stage 22 of FIG. 2, on a scan list comprising a plurality of scan members sorted at least by candidate frequency of each scan member. A scan member can be any signal that is associated with a candidate frequency, for example a frequency channel like a narrow banded signal modulated on the candidate frequency possibly carrying some synchronization identifiers like a primary synchronization sequence (PSS) in an LTE system. The frequency scan may be performed by inspecting the candidate frequency of a first scan member to obtain at least one inspection result. This may involve computing detection metrics, see metric evaluations stage 23 of FIG. 2, by correlating a corresponding signal of the scan member against a periodic synchronization sequence. The corresponding signal may be obtained by decimating the scan member such that the corresponding signal corresponds to the periodic synchronization sequence. Inspecting a candidate frequency may also involve simply computing the energy of the scan member.

The method may further comprise using the at least one inspection result to determine whether a signal of interest is present on the candidate frequency. A signal of interest can be a detected synchronization identifier or a certain amount of energy of a scan member. Generally, using the at least one inspection result to determine if a signal of interest is present on the candidate frequency comprises comparing the detection metrics against a threshold. Based on this result, a decision made whether the frequency scan is continued or whether a cell scan shall be activated immediately for the specific candidate frequency, see decision stage 24 of FIG. 2.

Upon determining that a signal of interest is present on the candidate frequency a cell scan, see cell scan stage 25 of FIG. 2, is performed for the candidate frequency by attempting to detect information of a cell. Otherwise the frequency scan is continued with a second scan member, preferably the next scan member, of the scan list.

In case a cell scan was activated, upon detecting information of a cell, the method comprises using the information to determine scan members of the scan list that do not contain valid cells and continuing the frequency scan by omitting scan members of the scan list that do not contain valid cells, see frequency skipping and system parameter re-tuning stage 26 of FIG. 2. Furthermore, information of a cell detected like cell ID, frame time, bandwidth, carrier frequency offset may be used for retuning the frequency scan stage 22 of FIG. 2 or the wideband buffering stage 21 of FIG. 2. This will improve the scan sensitivity.

In case a cell scan was activated and no information of a cell could be detected the frequency scan may be continued with a next scan member of the scan list.

As the memory used for buffering the wideband signal may be limited, the wideband signal initially buffered may not include all possible candidate frequencies. Therefore, re-buffering may be required. Re-buffering may involve acquiring further radio samples by the RF/analog transceiver 18 of FIG. 1. In case a frequency offset was determined during cell scan, the frequency offset may be used for tuning the oscillator of the RF/analog transceiver taking into account the determined frequency offset.

If all candidate frequencies have been scanned or checked, the entire PLMN search is finished.

The frequency scan stage may employ a received signal strength indication (RSSI) based approach or correlation based approaches.

Figure 3:
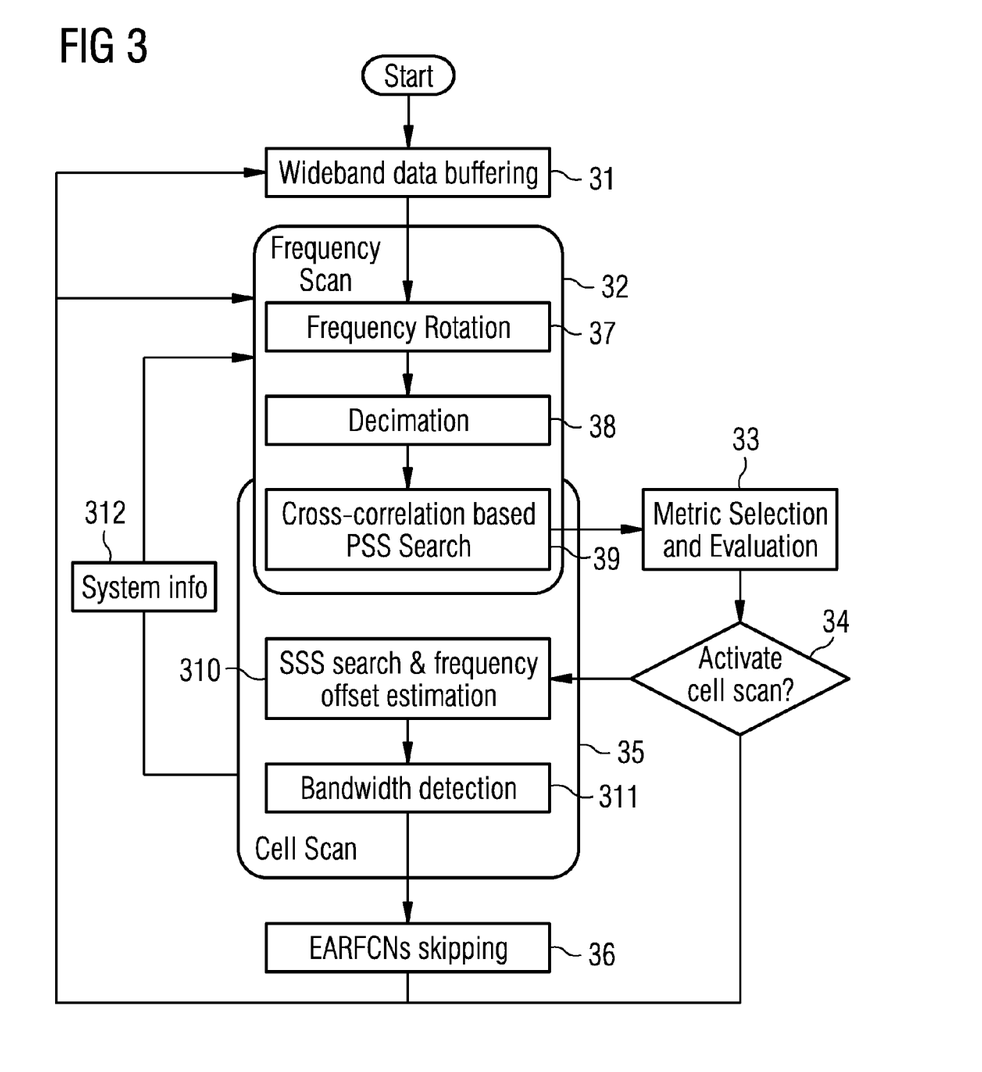
FIG. 3 shows a flow chart of a fast PLMN search method for an LTE system.

The method for searching for a PLMN according to the present disclosure may be employed in an LTE system as shown in FIG. 3.

After buffering wideband data, see wideband buffering stage 31, a frequency scan 32 is performed. A time-domain cross correlation based PSS search is used for scanning candidate frequencies. The buffer wideband data first passes frequency rotation stage 37, which rotates the center frequency of the wideband data. Thus, a scan member of the scan list is determined by rotating the center frequency of the wideband signal. After frequency rotation, the scan member is decimated to get a narrow band signal, where a primary synchronization sequence (PSS) and a secondary synchronization sequence (SSS) are located if there is any. Hence, the narrow band signal is a signal that corresponds to PSS and SSS. Thus, a corresponding signal of the scan member is obtained by decimating the scan member such that the corresponding signal corresponds to the periodic synchronization sequence. Detection metrics are then computed by correlating the corresponding signal of the scan member against a periodic synchronization sequence, in this example the PSS, see cross correlation based PSS Search stage 39. The metrics are compared against a threshold for determining whether there is a signal of interest on the candidate frequency, see metric selection and evaluation stage 33.

The advantage of a time-domain cross correlation based frequency scan is twofold. First of all, the results from the frequency scan stage 32, specifically information contained in the detected PSS, can be reused in the cell scan stage 35, since PSS detection is already performed in the frequency scan stage 32. Secondly, sensitivity can be much higher compared to other scan methods, e.g. RSSI based method and auto-correlation based methods.

Base on the metric evaluation, a decision is made whether to immediately activate a cell scan on the can member associated with the candidate frequency currently investigated or whether to resume the frequency scan with the next scan member of the scan list, see decision stage 34.

During cell scan, frequency offset estimation may be carried out, see SSS search and frequency offset estimation stage 310. The estimated frequency offset can help in the subsequent frequency scan of a next scan member. Specifically, the frequency offset may be used for updating the corresponding candidate frequency of remaining scan members of the scan list. The frequency offset determined during cell scan may be used for updating the candidate frequency when rotating the center frequency of the wideband signal for determining a next scan member of the scan list. Apart from compensating the frequency offset by taking such an offset into account during the frequency rotation stage 37, the frequency offset may be used for tuning an oscillator of the RF/analog transceiver 18 as shown in FIG. 1 when acquiring a next wideband signal. With frequency offset compensation, the sensitivity of frequency scan can be increased significantly in subsequent frequency scans. The frequency offset is part of any system information 312 obtained during cell scan used for updating the frequency scan.

In cross correlation based methods, there exists a tradeoff between coherent combing gain and frequency offset robustness. In case the mobile device has not found any valid cell during PLMN search, the frequency offset has to be assumed large in some cases, e.g. during power up procedure. Thus, sensitivity is sacrificed in these cases. However, once one cell is detected and frequency offset is largely compensated, the cross correlation based methods, like the PSS search 39 and SSS search 310 of FIG. 3, can be configured to a higher sensitivity mode as a large frequency offset capture is no longer needed.

Note that the carrier frequency offset has a linear relationship with carrier center frequency. Given the same crystal condition, the higher the center frequency is, the larger the carrier frequency offset will be. Therefore, it is desirable to start the frequency scan at the lowest possible frequency. For example, 800 MHz band should be tried first before 2.0 GHz band. If a cell is successfully detected in the 800 MHz band, the large frequency offset at the 2.0 GHz band can be compensated at the frequency rotation stage 37 by linearly scaling the estimated frequency offset obtained at 800 MHz, making the PLMN search at 2 GHz band faster and more accurate. Otherwise, the large frequency offset at 2.0 GHz may exceed the frequency offset capture range of the cell search, causing the PLMN search at this band to be slower and less accurate.

If a SSS is detected during SSS search 310, the information contained in the SSS may be used for detecting the bandwidth of the cell at the bandwidth detection stage 311. Then, the frequency scan 32 can be continued by omitting scan members associated with candidate frequencies, see EARFCNs skipping stage 36, falling into the bandwidth of the cell.

During the entire proposed PLMN search procedure, several stages are vital. They include metric selection and evaluation 33, bandwidth detection 35 and candidate frequency skipping 36. In following subsections, these stages will be discussed one by one with simulation results.

With a non-optimal metric selection and evaluation method, false triggers or mistriggers of the cell scan can happen so that entire PLMN procedure can be slowed down. In this section, we metric selection and evaluation methods are presented, whose performance is demonstrated via system simulation results depicted in FIG. 4-6.

The first stage in the proposed metric selection and evaluation method is the PSS correlation value calculation per EARFCN as shown in Eq. 1.

$$pcor_{n,l} = \sum_{m=0}^{M-1}\sum_{k=0}^{K-1} r(m, n-k) * x_l^*(k) \quad (1)$$

where M stands for number of half radio frames used for averaging, K stands for length of PSS reference signals, r(m, n) is the $n^{th}$ received sample at the $m^{th}$ half frame signal, $x_l(k)$ is the $k^{th}$ sample of the $l^{th}$ local PSS reference sequence.

The average and maximum value of PSS correlation results are then calculated respectively as in Eq. 2 and 3.

$$\overline{pcor} = \sum_{l=0}^{L-1}\sum_{n=0}^{N-1} pcor_{n,l}/(N*L) \quad (2)$$

$$pcor_{max} = \max(pcor_{n,l}) \quad (3)$$

where N is the number of sample per half frame and L is the number of PSS sequences. The metric per EARFCN is defined as the ratio between maximum and average of PSS correlation value as in Eq. 4.

$$relCor = pcor_{max}/\overline{pcor} \quad (4)$$

Hence, computing detection metrics comprises determining a plurality of correlation values per radio sample and local periodic synchronization sequence $pcor_{n,l}$ according to Eq. 1, determining an average correlation value $\overline{pcor}$ by averaging the plurality of correlation values over a number of radio samples and local periodic synchronization sequences according to Eq. 2; determining a maximum correlation value $pcor_{max}$ of the plurality of correlation values according to Eq. 3 and determining a relative correlation value relCor by computing a ratio of the maximum correlation value $pcor_{max}$ and the average correlation value $\overline{pcor}$ according to Eq. 4. The number of radio samples is the maximum number of radio samples within a half radio frame of an LTE system.

The metric evaluation may be improved by coherently adding correlation values of a plurality of correlation periods. A correlation period of the plurality of correlation periods corresponds to one half radio frame of an LTE system.

Figure 4:
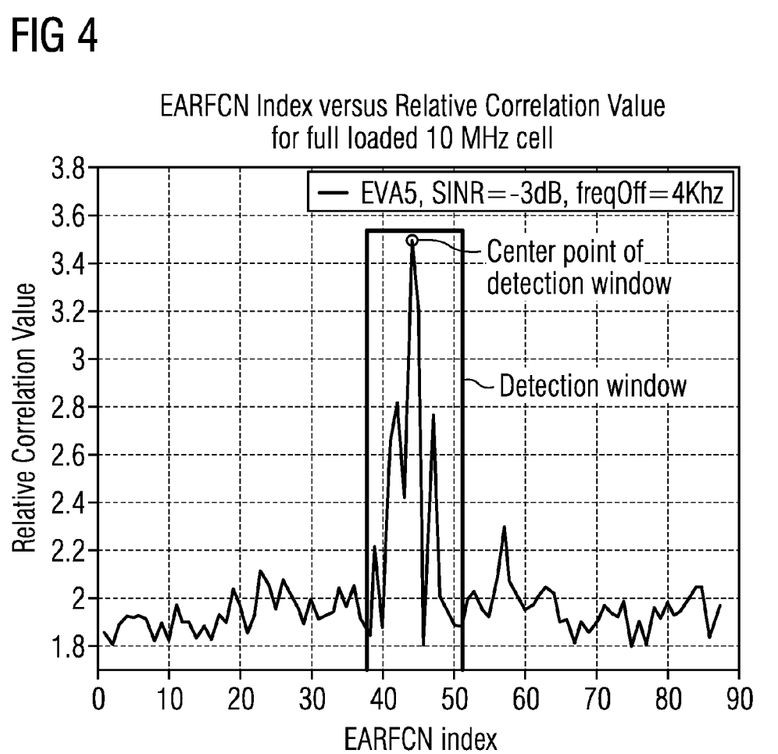
FIG. 4 shows a diagram of a relative correlation value versus a candidate frequency index.

FIG. 4 shows a simulation plot, where 87 EARFCNs are used with a cell located at the center EARFCN (i. e. the $44^{th}$ EARFCN). In this simulation, the Extended Vehicular EVAS channel is assumed. Signal to interference and noise ratio (SINR) is set to −3 dB. The cell is at full load with a system bandwidth of 10 Mhz. Full load means a maximum number of subcarriers is employed. The carrier frequency offset is set to 4 KHz. As shown in FIG. 4, a clear peak of relCor value is at the center EARFCN where the cell is located.

To make a metric evaluation, a detection window with a length M is defined, see bold solid line in FIG. 4. If the conditions shown in Eq. 5-7 are met, the PLMN search procedure will switch from frequency scan to cell scan.

$$relCor_{(M-1)/2} = \max(relCor_m), \quad (5)$$
$$m = 0 \ldots M-1$$

$$relCor_{(M-1)/2} > Threshold0 * \sum_{u=0}^{U-1}(relCor_u + relCor_{M-1-u})/2U \quad (6)$$

$$relCor_{(M-1)/2} > Threshold1 \quad (7)$$

Hence, computing detection metrics comprises choosing a limited number of largest M relative correlation values and comparing each relative correlation value of the limited number of largest relative correlation values against a threshold and determining that there is a signal of interest on the candidate frequency corresponding to the relative correlation value exceeding the threshold.

Figure 5:
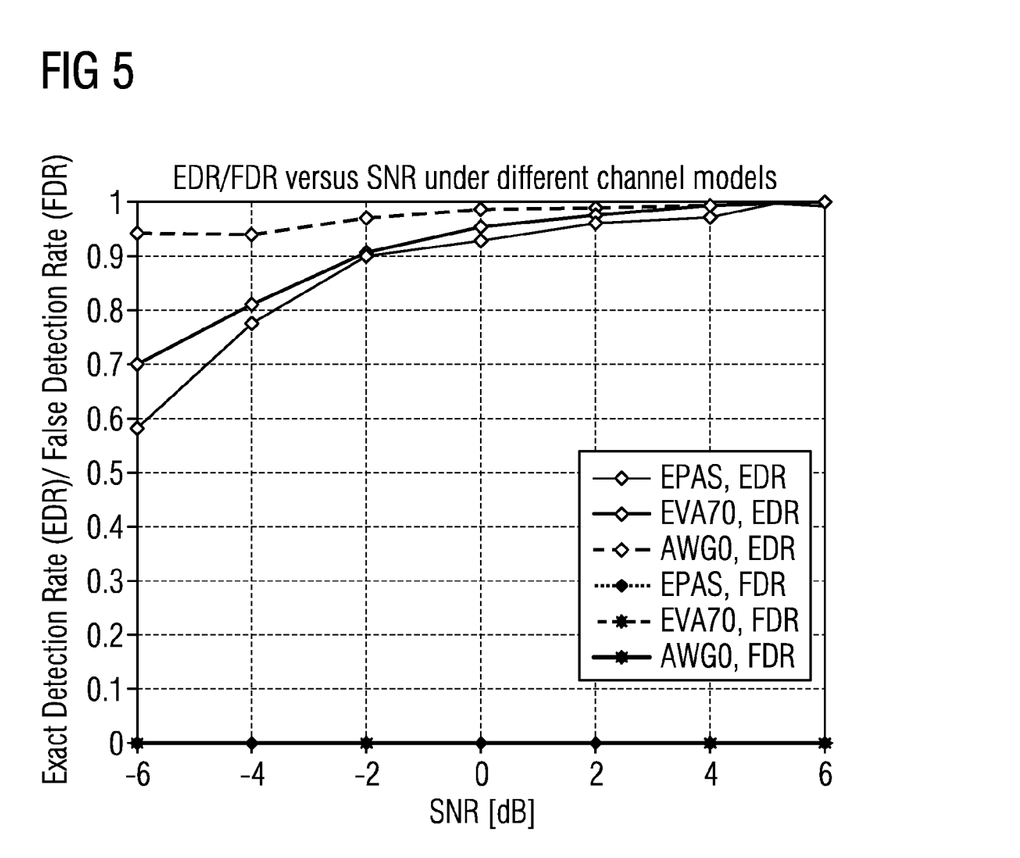
FIG. 5 shows a diagram of an exact detection rate and a false detection rate versus a signal to noise ratio under different channel models.

FIG. 5 shows the performance in the interference limited case. In this simulation, SNR is set to 5 dB. Frequency offset is set to 4 KHz. The number of cells in the simulation is varied from 1 cell to 4 cells. Note that all cells are set to the same transmit power in the simulation. Different channel conditions are used. Exact Detection Rate (EDR) and False Detection Rate (FDR) are plotted.

As shown in FIG. 5, the EDR is always above or around 90%, while the FDR is constantly 0 in these interference limited case.

Figure 6:
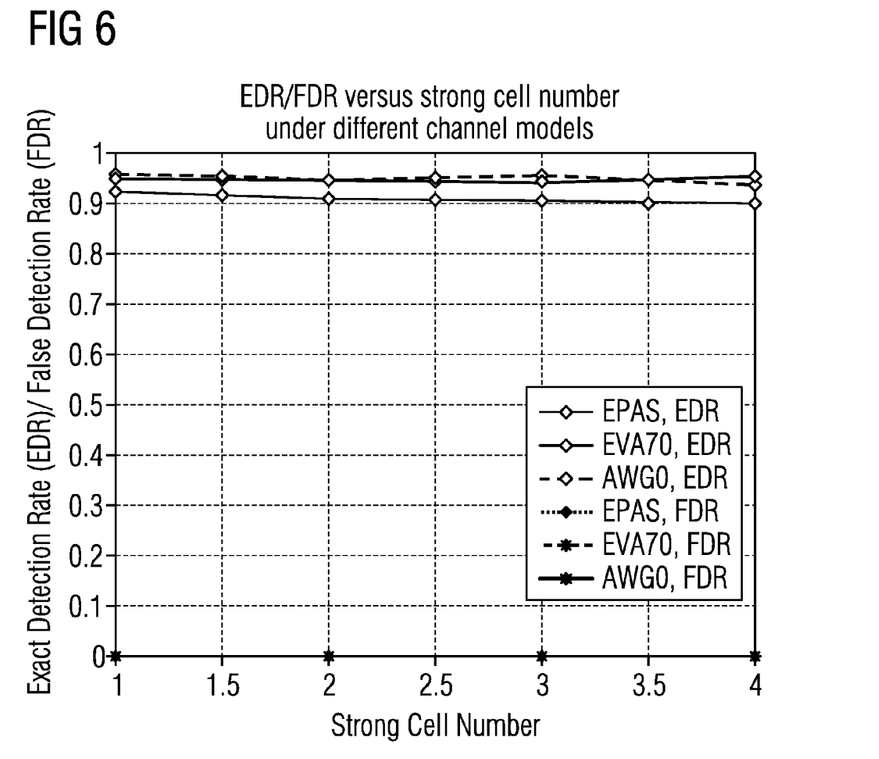
FIG. 6 shows a diagram of an exact detection rate and a false detection rate versus a strong cell number under different channel models.

FIG. 6 shows the performance in the noise limited case. In this simulation, the signal to noise ratio (SNR) is varied. Frequency offset is again set to 4 KHz. The number of cells in the simulation is set to 1.

As shown in the FIG. 6, the EDR is always above or around 90% when SNR is above −2 dB, while the FDR is constantly 0.

The thresholds for computing the detection metrics are chosen such that FDR is minimized and the EDR is maximized.

Bandwidth detection is an important feature in order to speed up PLMN search according to the present disclosure. Based on detected system bandwidth, a large number of candidate frequencies, EARFCNs in an LTE system, can be skipped for further frequency scan. A detailed EARFCN skip scheme will be discussed in the next section.

A straightforward way to detect bandwidth in an LTE system is via master information block detection, which can take more than 50 ms in worst channel scenario. Another way for bandwidth detection is blind detection, which is fast and accurate. Also it can be used to detect whether the cell detection is a false detection or not based on some metrics, e.g. a signal to interference noise ratio (SINR) value. With the detected system bandwidth, EARFCNs which for sure will not contain cells are skipped in next frequency scan round.

Figure 7:
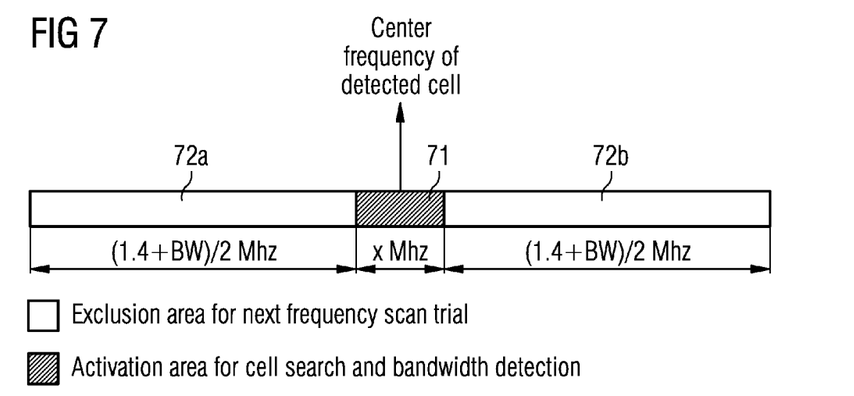
FIG. 7 shows a diagram of a bandwidth separated in an activation area for performing cell search and bandwidth detection and an exclusion area for skipping candidate frequencies during a subsequent frequency scan.

An EARFCN skipping example is shown in FIG. 7. Center x MHz, see activation area 71, is used for the frequency scan, while EARFCNs fallen out of the frequency scan region but within (1.4+BW) MHz, see exclusion area 72a and 72b, are skipped for the subsequent frequency scan. BW denotes the detected system bandwidth. Apparently, the smaller x is, the faster the entire PLMN search will end up with.

One way to make x small is to have a good starting point for frequency scan. In an LTE system, this can be done via storing all possible LTE center frequencies that operators will possibly use for different countries at a mobile device. The frequency scan uses these possible center frequencies as the starting point. For example, a mobile device can store all PLMNs and related frequency information at its non-volatile memory.

The next subsection refers to blind bandwidth detection. The bandwidth associated with a cell may be determined by dividing a detection space defined by the bandwidth into a plurality of subsets, wherein each subset of the plurality of subsets is associated with a specific value of the bandwidth; blindly detecting at least one reference signal of the detection space; and identifying the specific value of the bandwidth upon detecting an existence of the at least one reference signal in the subset associated with the specific value. The detections space is a set of reference signals, for example a periodic synchronization sequence like PSS or SSS in an LTE system. The size of the detection space depends on the number of reference signals available for the maximum specific value of the bandwidth.

In an OFDM system a limited number of subcarriers carry reference signals, in case of LTE cell specific reference signals (CRS) constituting the PSS and SSS, for performing channel estimation. As it is a priori unknown whether in a subset of the detection space subcarriers carrying reference signals exist or not at least one reference signal of a subset is blindly detected. Blindly detecting in this context means a subcarrier in the time-frequency grid possibly carrying a reference signal is examined for whether the subcarrier is carrying a reference signal or not by computing its detection metrics.

A detection space is said to be complete if it contains all reference signals for a maximum bandwidth. In case all the reference signals of a complete detection space are examined, hence blindly detected, dividing the detection space into a plurality of subsets is equivalent to grouping all the reference signals into the plurality of subsets. Thus, a subset of the detection space represents a group of reference signals associated with a specific value of an impact factor. Two kinds of strategies to group the CRS are proposed.

As a first strategy, subcarriers within center K MHz but not L MHz are put into the $M^{th}$ group. The K, L and M values are listed in the following table. The center bandwidth K corresponds to the maximum possible bandwidth of subset with its center at a specific center frequency.

Hence, a subset M is defined by its center bandwidth K(M) and exclusion bandwidth L(M), the subset comprising reference signals in a range between its center bandwidth K(M) and exclusion bandwidth L (M), wherein the exclusion bandwidth L(M) corresponds to the center bandwidth K (M−1) of another subset (M−1). The exclusion bandwidth L(1) of the subset M=1 corresponding to the minimum system configuration is zero MHz. Thus, subsets are disjunct.

As a second strategy, subcarriers within center K MHz are put into the $M^{th}$ group. Hence, a subset of the detection space is defined merely by its center bandwidth. Thus, subsets overlap.

| M | K | L |
|---|----|-----|
| 1 | 1.4 | 0 |
| 2 | 3 | 1.4 |
| 3 | 5 | 3 |
| 4 | 10 | 5 |
| 5 | 15 | 10 |
| 6 | 20 | 15 |

Figure 8:
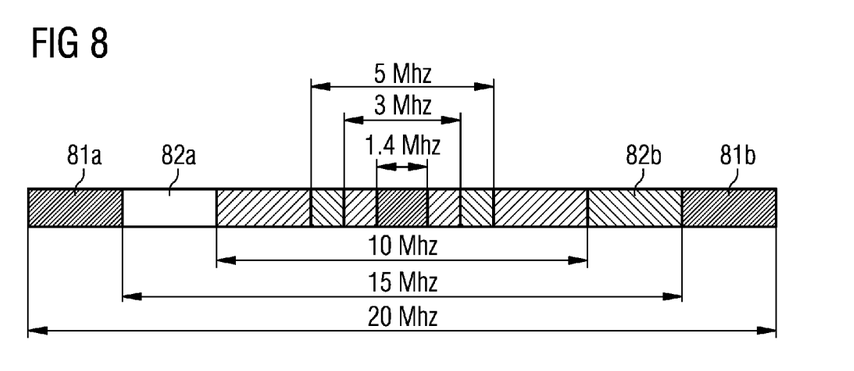
FIG. 8 shows a diagram of subcarrier grouping for blind bandwidth detection.

FIG. 8 shows a diagram of a subcarrier grouping in case of unknown bandwidth according to the first strategy. Thus, the detection space of CRS subcarriers is divided into a plurality of disjunct subsets. Each subset corresponds to a value of the impact factor bandwidth. For example, for the 20 MHz bandwidth the corresponding subset is indicated by labels 81*a* and 81*b*, for the 15 MHz bandwidth the subset is indicated by labels 82*a* and 82*b*. The maximum number of subsets is 6 in this example.

Figure 9:
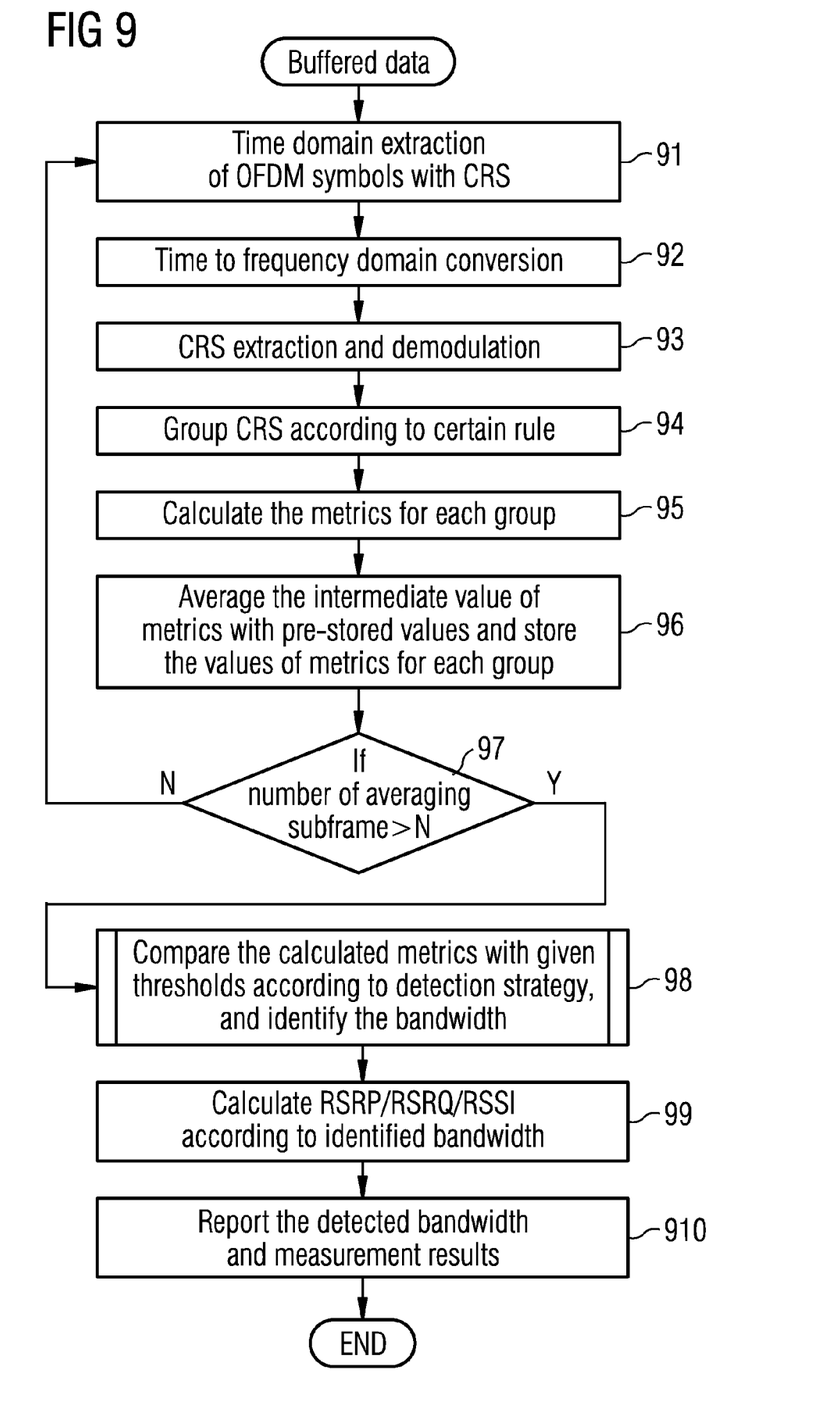
FIG. 9 shows a flowchart for blind bandwidth detection.

A flow chart of a method for blindly detecting an unknown bandwidth is shown in FIG. 9 and the detailed steps are described as follows:

Time domain OFDM symbols of buffered data which include CRS are extracted, as shown in stage 91.

The input sub-frame is sampled assuming the highest bandwidth a measurement receiver can handle or the possible maximum bandwidth configured by a higher layer, for example by the MAC/Phy controller 110 as shown in FIG. 1. The extraction in time domain shall consider the sub-frame type, and only downlink sub-frames shall be included.

After time domain extraction of OFDM symbols containing CRS, the symbols are converted into the frequency domain as shown in stage 92. Then, cell specific reference signals are extracted according to the transmit antenna configuration and maximum possible bandwidth, see stage 93. The CRS are divided into several subsets or groups, as shown in stage 94.

The detection metrics for each subset or group are calculated, see stage 95. Then, the intermediate metrics values are averaged with corresponding pre-stored values and the results are stored as shown in stage 96. In case there is no pre-stored value, the results are stored directly. If the number of averaging sub-frames is larger than a pre-defined value N, the method is continued at stage 98; otherwise at stage 99; see decision stage 97. The calculated metrics are compared with a given threshold according to the detection strategy, and the bandwidth is identified. Reference signal received power (RSRP)/reference signal received quality (RSRQ)/reference signal strength indicator (RSSI) results according to the identified bandwidth are calculated, see stage 99. Finally, the detected bandwidth and the measurement results are reported to the frequency search stage, see stage 910.

The present disclosure further relates to a mobile device 14 as show in FIG. 1. The mobile device comprises: a radio frequency module 15 for acquiring radio samples. It further comprises a synchronization and cell detection module 19 being configured:

+ to perform a frequency scan on a scan list comprising a plurality of scan members sorted at least by a candidate frequency of each scan member,
+ to inspect a candidate frequency of a first scan member to obtain at least one inspection result;
+ to determine whether a signal of interest is present on the candidate frequency based on the at least one inspection result;
+ if a signal of interest on the candidate frequency, to perform a cell scan for the candidate frequency by attempting to detect information of a cell;
+ if no signal of interest is present, to continue the frequency scan with a second scan member in the scan list; and
+ upon detecting information of a cell, to determine the plurality of scan members that do not contain valid cells using the information and to continue the frequency scan by omitting scan members of the scan list that do not contain valid cells;
+ otherwise to continue the frequency scan with a next scan member of the scan list.

The radio frequency module 15 may be further configured to take into account detected information of a cell for tuning an oscillator of the radio frequency module 15, specifically an oscillator of the RF/analog transceiver 18.

The present disclosure further relates to a computer readable medium having computer-executable instructions for performing the method for searching for PLMNs as disclosed above.

In this disclosure a PLMN search method is presented which can switch adaptively from a frequency scan to a cell scan step when certain switching criteria are met. If successful cell detection is achieved during the cell scan stage, a portion of candidate frequency is skipped based on detected cell bandwidth. Moreover, system parameters used for a subsequent frequency scan are tuned to get better performance after correction of certain impairment parameters, e.g. carrier frequency offset, which are obtained during cell scan stage.

There are several advantages of the proposed PLMN search. First of all, time spent on the frequency scan can be significantly shortened in many scenarios compared to conventional PLMN method. Secondly, the sensitivity of PLMN can be improved with parameter correction once a first successful cell detection is achieved. Both of them, shorter time and better sensitivity, may indicate the reduction of power consumption at the mobile device—which usually is critical factor at a mobile device. Moreover, the implementation complexity of the proposed method is reasonable both in terms of calculation and storage requirement, and it is easy to implement.

What is claimed is:

1. A method for searching for a mobile network, the method comprising:
    performing a frequency scan on a scan list comprising a plurality of scan members sorted at least by candidate frequency;
    interrupting the frequency scan when a signal of interest has been detected on a candidate frequency and immediately performing a cell scan on said candidate frequency;
    upon detecting information of a cell for said candidate frequency, determining a plurality of candidate frequencies that do not contain valid cells by using the information; and
    omitting the plurality of candidate frequencies that do not contain valid cells when resuming the frequency scan,
    wherein performing the frequency scan comprises computing detection metrics by correlating a corresponding signal of the scan member against a primary synchronization sequence; and
    wherein the correlating includes correlating a corresponding signal of the scan member against a primary synchronization sequence using a correlation period comprising one-half of a radio frame.

2. The method according to claim 1, wherein the information of a cell includes at least a bandwidth associated with the cell and wherein the method comprises continuing the frequency scan by omitting scan members comprises omitting scan members falling into the bandwidth of the cell.

3. The method according to claim 1, wherein performing the frequency scan comprises inspecting a candidate to obtain at least one inspection result and wherein performing the cell scan comprises using the at least one inspection result.

4. The method according to claim 1, wherein performing the frequency scan comprises;
    determining whether a signal of interest is present on the candidate frequency by comparing the detection metrics against a threshold.

5. The method according to claim 4, the method further comprising:
    obtaining a corresponding signal of the scan member by decimating the scan member such that the corresponding signal corresponds to the periodic synchronization sequence.

6. The method according to claim 4, wherein in an OFDM system obtaining the corresponding signal comprises decimating the scan member to isolate subcarriers possibly carrying symbols of the periodic synchronization sequence.

7. The method according to claim 4, wherein the periodic synchronization sequence is a primary synchronization sequence of an LTE system.

8. The method according to claim 7, the method comprising: using information contained in a detected primary synchronization sequence for performing the cell scan.

9. The method according to claim 1, wherein computing detection metrics comprises determining a plurality of correlation values per radio sample and local periodic synchronization sequence;
    determining an average correlation value by averaging the plurality of correlation values over a number of radio samples and local periodic synchronization sequences;
    determining a maximum correlation value of the plurality of correlation values and
    determining a relative correlation value by computing a ratio of the maximum correlation value and the average correlation value.

10. The method according to claim 9, wherein computing detection metrics comprises choosing a limited number of largest relative correlation values and comparing each relative correlation value of the limited number of largest relative correlation values against a threshold and determining that there is a signal of interest on the candidate frequency corresponding to the relative correlation value exceeding the threshold.

11. The method according to claim 9, wherein the number of radio samples is the maximum number of radio samples within a half radio frame of an LTE system.

12. The method according to claim 9, wherein computing detection metrics comprises coherently adding correlation values of a plurality of correlation periods.

13. The method according to claim 12, wherein a correlation period of the plurality of correlation periods corresponds to one half radio frame of an LTE system.

14. The method according to claim 1, wherein performing a cell scan further comprises determining a frequency offset when information of a cell could be detected and continuing the frequency scan comprises using the frequency offset for updating the corresponding candidate frequency of remaining scan members of the scan list.

15. The method according to claim 1, wherein performing the frequency scan comprises starting with the scan member having the lowest corresponding candidate frequency.

16. The method according to claim 1, the method comprising:
    acquiring and buffering a wideband signal comprising a plurality of scan members and determining a scan member of the scan list by rotating a center frequency of the wideband signal.

17. The method according to claim 16, the method further comprising:
    using a frequency offset determined during cell scan for updating the candidate frequency when rotating the center frequency of the wideband signal for determining a next scan member of the scan list.

18. The method according to claim 16, the method further comprising:

using a frequency offset determined during cell scan for tuning an oscillator used for acquiring radio samples when acquiring a next wideband signal.

19. The method according to claim 2, wherein the bandwidth associated with a cell is determined by dividing a detection space defined by the bandwidth into a plurality of subsets, wherein each subset of the plurality of subsets is associated with a specific value of the bandwidth;
blindly detecting at least one reference signal of the detection space; and
identifying the specific value of the bandwidth upon detecting an existence of the at least one reference signal in the subset associated with the specific value.

20. The method according to claim 19, the method further comprising:
blindly detecting a plurality of reference signals of a complete detection space;
grouping the reference signals of the plurality of reference signals to subsets of the plurality of subsets; and
identifying the specific value of the bandwidth upon detecting an existence of reference signals in the subset associated with the specific value.

21. The method according to claim 19, wherein a subset is defined by its center bandwidth.

22. The method according to claim 19, wherein a subset is defined by its center bandwidth and exclusion bandwidth, the subset comprising reference signals in a range between its center bandwidth and exclusion bandwidth,
wherein the exclusion bandwidth corresponds the center bandwidth of another subset, and wherein the exclusion bandwidth of the subset corresponding to a minimum system configuration is zero.

23. A mobile device comprising:
a radio frequency module for acquiring radio samples;
a synchronization and cell detection module being configured:
to perform a frequency scan on a scan list comprising a plurality of scan members sorted at least by a candidate frequency of each scan member,
to inspect a candidate frequency of a first scan member to obtain at least one inspection result;
to determine whether a signal of interest is present on the candidate frequency based on the at least one inspection result;
if a signal of interest on the candidate frequency, to perform a cell scan for the candidate frequency by attempting to detect information of a cell;
if no signal of interest is present, to continue the frequency scan with a second scan member in the scan list; and
upon detecting information of a cell, to determine the plurality of scan members that do not contain valid cells using the information and to continue the frequency scan by omitting scan members of the scan list that do not contain valid cells; otherwise to continue the frequency scan with a next scan member of the scan list,
wherein, during a frequency scan, the synchronization and cell detection module is configured to correlate a corresponding signal of the scan member against a primary synchronization sequence to compute detection metrics using one-half of a radio frame as a correlation period.

24. The mobile device according to claim 23, wherein the radio frequency module is further configured to take into account detected information of a cell for tuning an oscillator of the radio frequency module.

25. A non-transitory, computer readable medium having computer-executable instructions for performing the method according to claim 1.

26. A method for searching for a mobile network, the method comprising:
performing a frequency scan on a scan list comprising a plurality of scan members sorted at least by candidate frequency;
interrupting the frequency scan when a signal of interest has been detected on a candidate frequency and immediately performing a cell scan on said candidate frequency;
upon detecting information of a cell for said candidate frequency, determining a plurality of candidate frequencies that do not contain valid cells by using the information; and
omitting the plurality of candidate frequencies that do not contain valid cells when resuming the frequency scan,
wherein performing the frequency scan comprises:
computing detection metrics by correlating a corresponding signal of the scan member against a periodic synchronization sequence; and
determining whether a signal of interest is present on the candidate frequency by comparing the detection metrics against a threshold; and
wherein computing detection metrics comprises:
determining a plurality of correlation values per radio sample and local periodic synchronization sequence;
determining an average correlation value by averaging the plurality of correlation values over a number of radio samples and local periodic synchronization sequences;
determining a maximum correlation value of the plurality of correlation values and
determining a relative correlation value by computing a ratio of the maximum correlation value and the average correlation value.

* * * * *